United States Patent [19]

Nagasaki

[11] Patent Number: 4,618,884
[45] Date of Patent: Oct. 21, 1986

[54] IMAGE PICKUP AND OBSERVATION EQUIPMENT FOR ENDOSCOPE

[75] Inventor: Tatsuo Nagasaki, Musashino, Japan

[73] Assignee: Olympus Optical Co., Ltd., Tokyo, Japan

[21] Appl. No.: 647,214

[22] Filed: Sep. 4, 1984

[30] Foreign Application Priority Data

Sep. 5, 1983 [JP] Japan .................. 58-163587

[51] Int. Cl.$^4$ .................. A61B 1/04; A61B 1/06
[52] U.S. Cl. .................. 358/98; 128/4; 128/6; 350/96.26; 356/241; 358/901
[58] Field of Search .................. 358/98, 901; 128/3-8, 128/303.15; 356/241; 350/96.26

[56] References Cited

U.S. PATENT DOCUMENTS

| 3,016,785 | 1/1962 | Kapany | 358/901 |
| 3,110,762 | 11/1963 | Frank | 358/901 |
| 3,217,588 | 11/1965 | Chitayat | 358/901 |
| 3,217,589 | 11/1965 | Chitayat | 358/901 |
| 3,740,115 | 6/1973 | Cole | 350/96.26 |
| 4,141,624 | 2/1979 | Siegmund | 350/96.26 |

Primary Examiner—Howard W. Britton
Attorney, Agent, or Firm—Armstrong, Nikaido, Marmelstein & Kubovcik

[57] ABSTRACT

The resolution in observing or picking up the image of a subject is improved by providing a driving means to vibrate part of the optical observation system of an endoscope using the image guide made of fiber bundle or the image-forming optical system of an endoscope using the solid pickup element, by a specified amount to meet the arrangement pitch of the said fibers or pickup elements.

5 Claims, 9 Drawing Figures

IMAGE PICKUP AND OBSERVATION EQUIPMENT FOR ENDOSCOPE

BACKGROUND OF THE INVENTION

This invention concerns image pickup and observation equipment for endoscope with improved resolution.

Recently image pickup equipment using solid pickup element is being practically used for television cameras, endoscopes, etc.

The present endoscope uses a bundle of, for example, tens of thousands of optical fibers with the diameter of tens of microns called image guide and light guide as image transferring means and light transferring means, and a subject image formed at the end face of the image guide by the image-forming optical system provided in the end part of the endoscope can be observed through the eye lens optical system at the rear end of the said image guide which is extended to the operating side at hand.

In such a case, the resolution of the image observed depends on the number of optical fibers to form the image guide and the more the fibers, the better, but in the inserting member which is made small in diameter to reduce the pain of the patient, the number of fibers tends to be decreased, thus reducing the resolution. Also, the boundaries among the fibers are observed as dark meshes and especially when enlarged, the observation becomes difficult.

Even if the solid pickup element is used, the resolution is not sufficient with the number of picture elements which can be contained in the inserting member and accurate diagnosis cannot be made through the observation.

Even if it is used for the television camera, the number of picture elements of the solid pickup element tends to be insufficient, and for this reason, the conventional example publicized in the Nikkei Sangyo Newspaper of July 18, 1983 improves the resolution by vibrating the CCD (charge coupled device) by ½ pitch of the arrangement of the light receiving elements.

But since the above conventional example vibrates the CCD itself which is connected to many signal lines, the contact failure tends to occur in the long-term use. Also, it must be vibrated together with the electrodes, etc., the load increases, and therefore, the bimorph piezo-electric element to vibrate it also increases in size and the CCD including vibrating and driving system becomes bulky. For this reason, it is difficult to use it for the endoscope which has a narrow inserting member. Furthermore, it cannot be used for the endoscope which uses the image guide.

BRIEF SUMMARY OF THE INVENTION

This invention was made taking into consideration the above points and has the objective to provide an image pickup and observation equipment for endoscope which can also be used for the endoscope which has a narrow inserting member and can improve the resolution and prevent the mesh pattern in case the image guide is used.

Other features and advantages of this invention will be made clear by the following explanation referring to the drawings.

BRIEF DESCRIPTION OF THE DRAWINGS

FIG. 5 shows a part of the endoscope which uses the embodiment 2 and FIG. 6 is a front view to show the arrangement of the light receiving elements of the solid pickup element at the image pickup surface.

DETAILED DESCRIPTION OF THE EMBODIMENTS

The following will explain the embodiment 1 of this invention referring to FIGS. 1 to 4.

Figure 1:
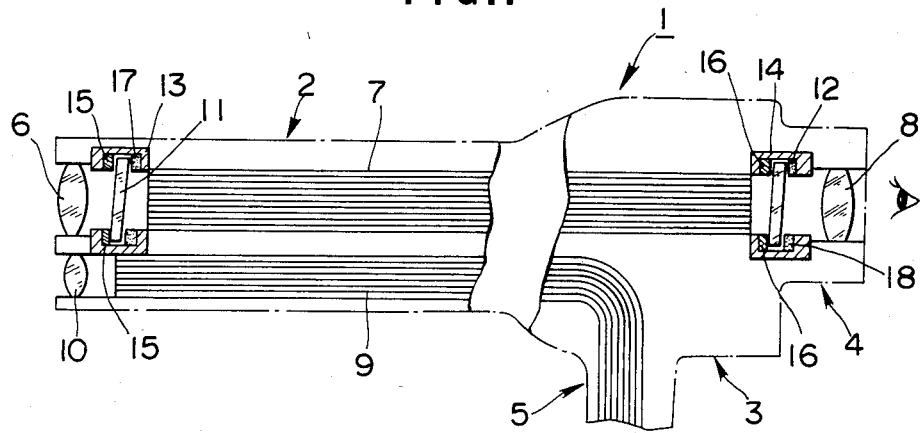
FIG. 1 to FIG. 4 concern the embodiment 1 of this invention and FIG. 1 is an explanatory drawing of the endoscope which uses the embodiment 1, FIG. 2 an explanatory drawing to show that the ray of light incident is deviated in direction, FIG. 3 a perspective side view to show the piezo-electric vibrator used for vibrating the transparent plate and FIG. 4 a side view to show the enlarged portion to hold the transparent plate in FIG. 1.

As shown in FIG. 1, the soft type endoscope 1 provided with the image pickup and observation equipment (observation equipment in this case) of the embodiment 1 consists of a narrow and flexible inserting member 2, operating part 3 which is continuously installed on the rear end side of the said inserting member 2, eye lens part 4 formed on the rear end side of the said operating part 3 and light guide cable 5 extended from the side of the operating part 3. The aforementioned inserting member 2 has an object lens system for image-forming at its end, and an image guide 7 made of an optical fiber bundle is inserted in the inserting member 2 in such a way that its end face comes to the position of optical image forming by the said object lens system 6. The image formed at the end face of the image guide 7 is transferred to the rear end face through the said image guide 7 and observed through the eye lens system 8 provided in the eye lens part 4.

The inserting member 2 includes a light guide 9 to transfer the illuminating light and the light guide 9 is bent in the operating part 3 and passed through the light guide cable 5, and by connecting the connector at its end to a light source (not illustrated), the light is transferred to the end face on the end side of the inserting member 2 and irradiated to a subject through the light distributing lens 10.

In the light passage between the object lens system 6 for image-forming and the front end face of the image guide 7, the image-forming position, a transparent plate 11 such as thin glass plate is provided to form an image-forming optical system and also between the rear end face of the image guide 7 and the eye lens system 8 a transparent plate 12 is provided to form an optical observation system.

Figure 3:
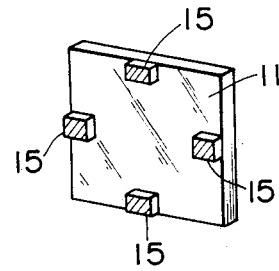
Figure 4:
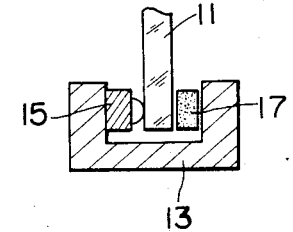

The aforementioned transparent plates 11 and 12 are contained and held in the frames 13 and 14 respectively via the piezo-electric vibrators 15, . . . , 15 (or 16, . . . , 16) which are in contact with the transparent body 11 (or 12) at 4 places, up, down, right and left periphery of one side and the damper 17 (or 18) (see FIG. 4) which is in contact with the other side at the periphery as shown in FIG. 3. The said piezo-electric vibrators 15 and 16 are fixed to the frames 13 and 14 respectively and support the transparent plates 11 and 12 via hemispherical members.

Figure 2:
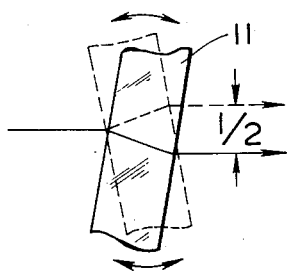

The corresponding ones of the said piezo-electric vibrators 15, ..., 15, for example, the upper and lower vibrators can be vibrated by applying AC voltage to change the thickness in the opposite phase, and the vibration vibrates the transparent plate 11 or 12 with the center as the fulcrum as shown by the arrows in FIG. 2. In such a case, the transparent plates 11 and 12 are synchronized to vibrate and the vibration causes deviation in the direction of light and the amount of the deviation is set to ½ of the pitch of the arrangement of the fibers to form the image guide 7 at the image-forming face.

The right and left piezo-electric vibrators 15 and 15 (or 16 and 16) also vibrates the transparent plate 11 (or 12) in a proper relationship with the aforementioned upper and lower vibrators. For example, the phase of the applied voltage is controlled in such a way that in the vibrating state as shown in FIG. 2, when the transparent 11 (or 12) becomes vertical, the horizontal vibration becomes maximum causing deviation of ½ of the pitch of the fiber arrangement. These vibrations should have the frequency higher than the frequency which can be observed as an image overlapped by the visual persistence.

In the embodiment 1 formed as above, the image can be observed from the rear of the eye lens part 4 while the transparent plates 11 and 12 are synchronized to vibrate ½ of the pitch of the fiber arrangement, and the resolution is doubled by the vibration of the piezo-electric vibrators 15 and 15 and 16 and 16 attached to the upper and lower parts of the transparent plates. Also, since the horizontal vibration is available, the horizontal resolution and also be doubled. Also, the moiré pattern which is caused when a striped pattern is seen can be eliminated. In this embodiment 1, the resolution can be greatly improved only by vibrating in small amplitude the transparent plates 11 and 12 such as glass plate or plastic plate, using the piezo-electric vibrators. Therefore, it can be used for the endoscope with a small number of fibers and can be contained in the inserting member 2 with small diameter. Also, the construction is simple and low cost can be achieved.

Figure 5:
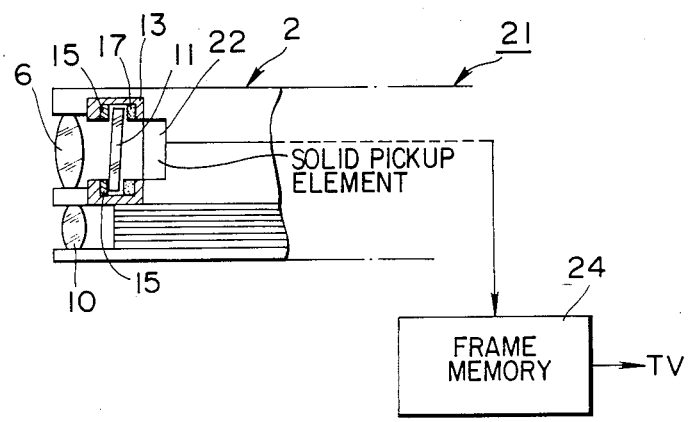
FIGS. 5 and 6 concern the embodiment 2 of this invention.
Figure 6:
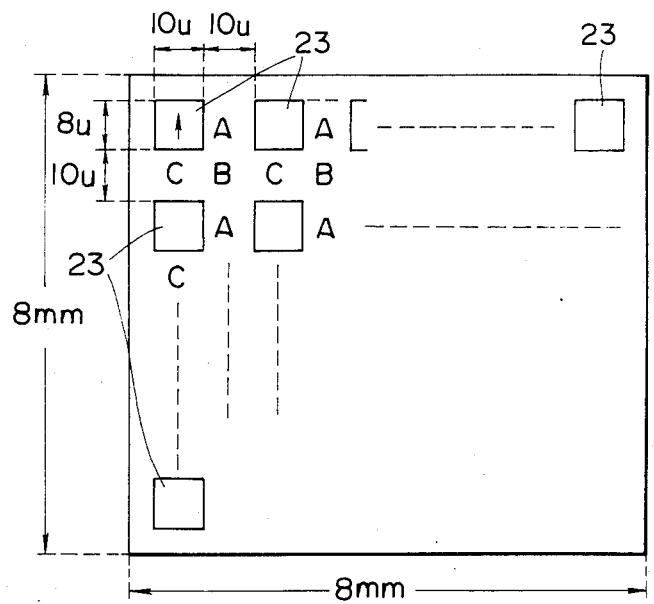

The following will explain the embodiment 2 referring to FIG. 5 and FIG. 6. The same symbols will be used for the same parts in the embodiment 1.

FIG. 5 shows an endoscope provided with the image pickup and observation equipment (image pickup equipment in this case) of the embodiment 2.

The endoscope 21 related to this embodiment uses the solid pickup element 22 using CCD, etc. and not using the image guide.

The light receiving elements 23, ..., 23 at the image pickup face (image-forming face) of the aforementioned solid pickup element 22 are arranged as shown in FIG. 6, and the quantity of light received by these light receiving elements 23, ..., 23 is converted into electrical signal and recorded in the frame memory 24 via the light guide cable, and the recorded electrical signal is converted into TV signal and can be displayed on the CRT. In the endoscope 21 using this embodiment, the transparent plate 11 described in the embodiment 1 is provided before the solid pickup element 22 in the image-forming optical system to form the image of a subject on the pickup face (no transparent plate is provided on the hand side).

The said transparent plate 11 is held by the piezo-electric vibrators 15, ..., 15 described in the embodiment 1 which are provided at the upper and lower and right and left places on the periphery of the transparent plate 11, via hemispheric members.

To these piezo-electric elements 15, ..., 15, pulse (voltage) is applied to vibrate, for example, the right and left vibrators first, and the passage of the light received first (before vibration) only at the position of the light receiving elements 23, ..., 23 shown in solid line in FIG. 6 is deviated by the vibration and the picture dots which should be formed at the position shown by the symbols A, ..., A are received by the light receiving elements 23, ..., 23. The subsequent pulse is applied to the upper and lower piezoelectric vibrators 15 and 15 causing the light passage vertically, and the picture dots which should be formed at the symbols B, ..., B are received by the light receiving elements 23, ..., 23. Then, the pulse applied to the right and left vibrators returns to the low level (or reverse polarity) and the picture dots which should be formed at C, ..., C are received by the light receiving elements 23, ..., 23. Subsequently the pulse applied to the upper and lower vibrators returns to the low level (or reverse polarity), and in such a way a 4-fold image can be received in a time sharing way by the light receiving elements 23, ..., 23 which are regularly arranged with some interval in the vertical and horizontal directions. Among the light receiving elements 23, ..., 23 which are arranged at some interval, transferring elements are formed.

The aforementioned pulses are formed, for example, by dividing the clock pulse used to take out the signals from the light receiving elements 23, ..., 23, and in the vibrating state after the pulse is applied (i.e. when the light receiving elements 23, ..., 23 the image which should be formed at the positions of the symbols A, ..., A, B, ..., B, and C, ..., C), the signals taken out of the light receiving elements 23, ..., 23 are sequentially stored in each memory element of the frame memory 24, and when the vertical and horizontal pulses are applied for one cycle, the frame memory 24 can store the signals of the number of picture elements of one frame.

In such a case, since the resolution of the solid pickup element 22 can be quadrupled, an area made smaller to, for example, ¼, by decreasing the number of picture elements, can be used without reducing the resolution.

Figure 7:
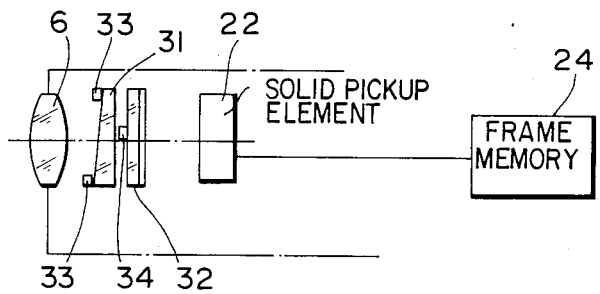
FIG. 7 is an explanation of the image pickup device of the embodiment 3 of this invention.

The following will explain the embodiment 3 of this invention referring to FIG. 7. The same symbols will be used for the same parts in the embodiment 1.

FIG. 7 shows an endoscope using the image pickup equipment of the embodiment 3. In this embodiment, the image-forming optical system is formed by providing 2 prisms 31 and 32 between the object lens system 6 and solid pickup element 11, and in this case, the prism 31 is held by means of the piezo-electric vibrators 33 and 33 provided at the upper and lower parts of the prism 31 and the prism 32 by means of the piezo-electric vibrators 34 and 34 (only one seen in the figure) provided at the right and left places of the prism 32.

The said prism 31 has different thickness vertically, and by vibrating slightly this prism 31 with the piezo-electric vibrators 33 and 33, the light passage through the prism 31 is greatly deviated vertically. Similarly the prism 32 has different thickness horizontally, and by the vibration, the light passage is greatly deviated horizontally.

Therefore, the resolution can be improved by vibrating these prisms 31 and 32 by ½ of the pitch of the vertical and horizontal arrangement of the light receiving elements at the image pickup surface of the solid pickup element 11. Since the light passage through the prisms 31 and 32 is greatly deviated by only a slight inclination, the vibration with a very small amplitude can improve the resolution. Therefore, even small piezo-electric vibrators 33, 33 and 34, 34 are enough. In the aforementioned embodiments, the piezo-electric vibrator 15, 16 or 33 can be only one, e.g. the upper one or lower one, and the same can be said for the piezo-electric vibrators which are provided at right and left.

Figure 8:
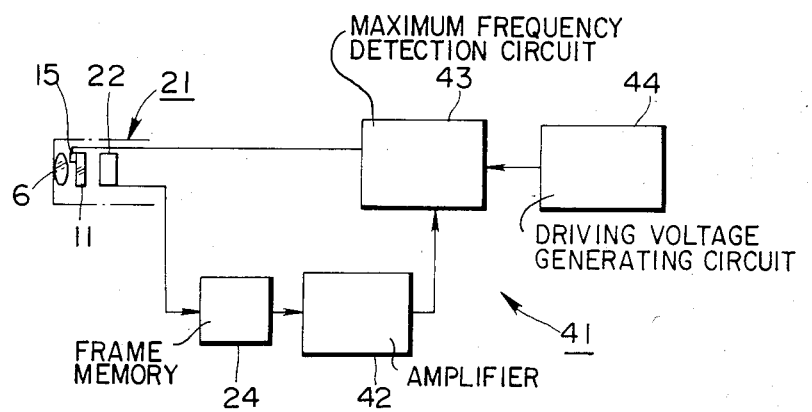
FIG. 8 is a block diagram to show the amplitude control circuit to control the vibration amplitude of the piezo-electric vibrator.

FIG. 8 shows the amplitude control circuit 41 when the piezo-electric vibrators 15, 16, 33 or 34 in the aforementioned embodiments are vibrated.

In this amplitude control circuit 41, the optical image formed by the solid pickup element, for example, in FIG. 5, is converted into electrical signals and recorded in the frame memory 24. In one appropriate line in the signals recorded in this frame memory 24, the signal of the picture element is taken in and the maximum value of the Fourier frequency component is detected by the maximum frequency detection circuit 42, and with the output signal from the detection circuit 42 as the control signal, the amplitude of the driving voltage applied to the piezo-electric vibrator (e.g. 15) is controlled to an appropriate amount (i.e. ½ of the pitch of the arrangement) after the amplification degree is controlled by the amplifier 43.

The amplifier 43 amplifies the vibrating voltage produced by the driving voltage generating circuit 44 at the amplification degree to meet the voltage applied to the control end.

The output signal of the said maximum frequency detection circuit 42 is formed, for example, as follows. The frequency obtained by multiplying the scanning frequency of one line by two times the number of picture elements is made maximum, and several filters to pass the frequencies gradually lower than that frequency are prepared, and by switching these filters sequentially by means of the analog switch or multiplexer and using the signal output after the filters, the frequency-voltage (f-v) conversion output is obtained. By comparing the conversion output with the conversion output of the same line but one frame before and outputting the bigger value as the control signal, the piezo-electric vibrator 15 is automatically maintained at the amplitude to improve the resolution to the maximum. Therefore, the deviation can be made exactly by ½ of the pitch of the arrangement regardless of the effect of temperature or ageing.

As a means of detecting the said maximum frequency, it is possible to use the surface wave real time Fourier transformation element, etc. The control can also be made by the comparison of the frequency components by reading in a very short time, shaping the waveform and passing through the counter, etc.

Figure 9:
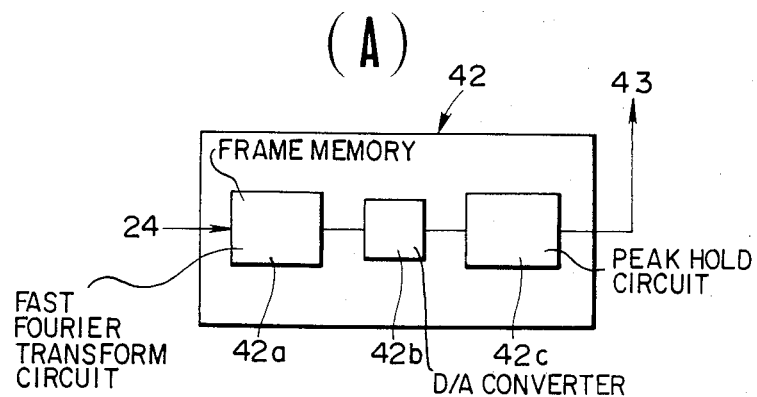
FIG. 9 (A) and (B) is embodiments of the maximum frequency detection circuit in FIG. 8.
Figure 9:
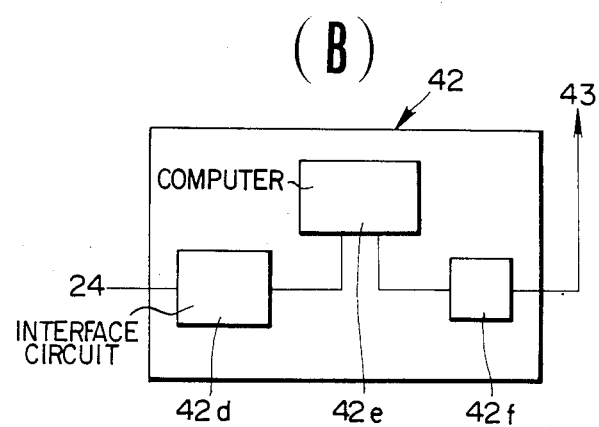

The aforementioned maximum frequency detection circuit 42 can be also formed as shown in FIG. 9 (A).

That is, the output of the said frame memory 24 is Fourier-transformed at a high speed by the F.F.T. (Fast Fourier Transform) circuit 42a and the Fourier transformation signal output is changed into analog signal by the D/A converter 42b, and the peak of the analog signal is detected by the peak hold circuit 42c, thus detecting the maximum frequency signal component. The aforementioned maximum frequency detection circuit 42 can also be formed as shown in FIG. 9 (B).

That is, the output of the aforementioned frame memory 24 is put in the computer 42e via the interface circuit 42d and in the computer 42e the Fourier transformation is done. In such a case, the Fourier transformation is carried out for the whole picture, i.e. two-dimensional processing, instead of one line in the picture. In this way, the maximum frequency component of the Fourier transformation output component can easily be detected.

In addition to the aforementioned embodiments, it is also possible to shift the light passage periodically by vibrating at least one part of the object lens system 6 (when the pickup element is used) not only in the optical image-forming system formed by providing the transparent plates 11 and 12 and prisms 31 and 32 but also the optical system without them, and such possibility also belongs to this invention. Also, in case the image guide is used, the object lens system 6 and eye lens system 8 can be synchronized at least partially to achieve periodic deviation.

This invention is not limited to the use for the endoscope and can be used widely for optical equipment which forms an image on the pickup face of the solid pickup element. It is also possible to rotate over a very small range of angle) and vibrate the prisms 31 and 32 in the embodiment 3, and this possibility also belongs to this invention. The deviation amount by vibration is not limited to ½ pitch of the arrangement, and for example, in case the adjacent light receiving elements are not contacting one another as in the case of FIG. 6, the resolution can be improved by shifting by 1/n (n is natural number), e.g. shifting by ⅓ horizontally or vertically (i.e. shifting ⅓ from the initial state, then ⅔ and returning to the original position). The electric machine conversion element as a means for driving can be piezo-electric vibrator or bimorph element. Also, the transparent plates 11 and 12, etc. with permanent magnet attached can be vibrated with the current run through the solenoid.

This invention provides a means to shift periodically by the amount to meet the pitch of the arrangement of the fibers or pickup elements of the image-forming face, etc. the image formed on the image-forming face or pickup face through the image-forming optical system, thus taking in the information in the periodically shifted state, and therefore, the image of high resolution can be obtained even if the number of picture elements is small.

Therefore, it can be contained in a small space. Also, the driving can be achieved by a smaller driving means than when the solid pickup element itself is vibrated. Even if a mesh or striped subject is picked up or observed, the moiré pattern can be eliminated by vibration.

It is clearly possible to form many other embodiments without conflicting with the spirit and scope of this invention and this invention is not limited to the particular embodiments stated here except the limitations described in the claims.

What is claimed is:

1. Image pickup and observation equipment for an endoscope which has an optical observation system to make it possible to observe the image of a subject formed on the image-forming face in the image-forming optical system using the eye lens optical system via fiber bundle, characterized in that it is provided with a driving means to vibrate at least part of the image-forming optical system of the endoscope using the said optical observation system by the amount to meet the pitch of the arrangement of the fibers on the image-forming face.

2. Image pickup and observation equipment for an endoscope which has an optical observation system to make it possible to observe the image of a subject formed on the image-forming face in the image-forming optical system using the light receiving elements arranged in the image-forming optical system using a solid pickup element, characterized in that it is provided with a driving means to vibrate at least part of the image-forming optical system of the endoscope using the solid pickup element by the amount to meet the pitch of the arrangement of the fibers or light receiving elements on the image-forming face.

3. The image pickup and observation equipment for endoscope described in claims 1 or 2 and characterized in that the said driving means is piezo-electric vibrator.

4. The image pickup and observation equipment for endoscope described in claims 1 or 2 and characterized in that the said driving means is automatically controlled so that the deviation amount of the incident rays by vibration becomes a specified amount to meet the arrangement on the image-forming face.

5. The image pickup and observation equipment for endoscope described in claims 1 or 2 and characterized in that the said driving means is a bimorph element.

* * * * *